US007546115B2

(12) United States Patent
O'Toole et al.

(10) Patent No.: US 7,546,115 B2
(45) Date of Patent: Jun. 9, 2009

(54) METHOD AND SYSTEM FOR WIRELESS SIGNALING OF VEHICULAR TRAFFIC

(75) Inventors: James O'Toole, Somerville, MA (US); David M. Bornstein, Westwood, MA (US)

(73) Assignee: Cisco Technology, Inc., San Jose, CA (US)

(*) Notice: Subject to any disclaimer, the term of this patent is extended or adjusted under 35 U.S.C. 154(b) by 515 days.

(21) Appl. No.: 11/305,702

(22) Filed: Dec. 16, 2005

(65) Prior Publication Data

US 2007/0142037 A1 Jun. 21, 2007

(51) Int. Cl.
*H04M 3/42* (2006.01)

(52) U.S. Cl. .................................... 455/414.1; 455/403

(58) Field of Classification Search .............. 455/414.1, 455/412.1, 403

See application file for complete search history.

(56) References Cited

U.S. PATENT DOCUMENTS 6,442,473 B1 * 8/2002 Berstis et al. ............... 701/117
6,937,162 B2 * 8/2005 Tokitsu et al. ............... 340/928
2004/0006705 A1 * 1/2004 Walker ....................... 713/200
2004/0125776 A1 * 7/2004 Haugli et al. ............... 370/338
2004/0162022 A1 * 8/2004 Lahetkangas et al. ...... 455/41.1

OTHER PUBLICATIONS

Meier, Rene, et al., "STEAM: Event-Based Middleware for Wireless Ad Hoc Networks", Department of Computer Science, Trinity College; Dublin, Ireland; publication date: 2002, http://ieeexplore.ieee.org/xpl/freeabs_all.jsp?arnumber=1030841; pp. 639-644.

Qingfeng Huang, Ronald Miller, "The Design of Reliable Protocols for Wireless Traffic Signal System", 13 pages, wucs-02-45, Jan. 9, 2003, Department of Computer Science, Campus Box 1045, Washington University, One Brookings Drive, St. Louis, MO 63130-4899.

* cited by examiner

*Primary Examiner*—Lester Kincaid
*Assistant Examiner*—Steven Lim
(74) *Attorney, Agent, or Firm*—Trellis IP Law Group, PC

(57) ABSTRACT

A method, a system, and an apparatus are provided for wireless communication of a traffic signal over a network. A message comprising data related to the traffic signal is received. Thereafter, the forwardability of the message is detemined. If forwardable, the message is forwarded. The validity of the message is checked and if found to be valid, information in the data is communicated to a vehicle controller. The message is discarded, if it is found to be invalid.

25 Claims, 7 Drawing Sheets

202 Version: 1.0

204 Signal Id: US/MA/02143/98723496

206 Signal Type: Stop Sign

208 Location: N 42° 22.298 W 071° 05.890
or UTM: 19T E 327245 N 4693171

210 Directionality: 180

212 State: On

214 Lanes: 2

216 Reference Location: (+0.001, -0.001)

218 Forwarding Regions: ([+0.010,-0.005],
[+0.003,-0.003])

220 GPS Timestamp: 2005-10-14 04:01:03.012
UTC

222 Validity Duration: +0.200

224 CertKeyId: US/MA/02143/80.0x9263

226 Signature: 0x976235902673

228 Hops To Live: 3

230 Checksum: 0x9278445

200

FIG. 2

METHOD AND SYSTEM FOR WIRELESS SIGNALING OF VEHICULAR TRAFFIC

BACKGROUND OF THE INVENTION

1. Field of Invention

Embodiments of the invention relate, in general, to the network communication technology. More specifically, embodiments of the invention relate to methods and systems for wireless signaling of vehicular traffic.

2. Description of the Background Art

Various traffic signals are used to guide and alert vehicular traffic. These traffic signals may be of various types, such as speed-limit signs, stop or yield signs, signboards, and traffic lights.

A traffic signal is sometimes obscured due to low-visibility conditions such as rain, fog and smoke. Visually impaired people also may find it difficult to see traffic signals. Moreover, traffic signals do not operate by means of an automated communication system. Therefore, they may not be observed by automated/mechanical systems, such as intelligent transport systems. An error in observing or interpreting a traffic signal may result in accidents.

At present, there are various techniques that can be used in wireless signal systems for controlling vehicular traffic. These techniques transmit signals to a network of vehicle nodes approaching or crossing the traffic signal. However, the data rate, power level and frequency used for the transmission of the signals may overload the network of vehicle nodes. Moreover, the computation capacity of the vehicle nodes may be exceeded. Further, the range of the traffic signals is restricted to the vicinity of that signal.

BRIEF DESCRIPTION OF THE DRAWINGS

FIG. 2 illustrates a traffic signal message, in accordance with an exemplary embodiment of the invention.

DETAILED DESCRIPTION OF EMBODIMENTS OF THE INVENTION

Various embodiments of the invention provide methods, systems, and computer-readable media for wireless communication of a traffic signal over a network. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Various embodiments of the invention provide a method, a system, and a computer program product for wireless communication of a traffic signal over a network. The network includes central transceiver unit (CTU) and a plurality of vehicles. Each of the plurality of vehicles includes a vehicle transceiver unit (VTU). The VTU receives an encoded message transmitted by the CTU. The encoded message includes data related to the traffic signal. The encoded message is decoded and the forwardability of the message is determined. If forwardable, the message is forwarded. Validity of the message is then checked. If the message is valid, information on type, status and positioning of the traffic signal is communicated to a vehicle controller. An invalid message is discarded.

Figure 1:
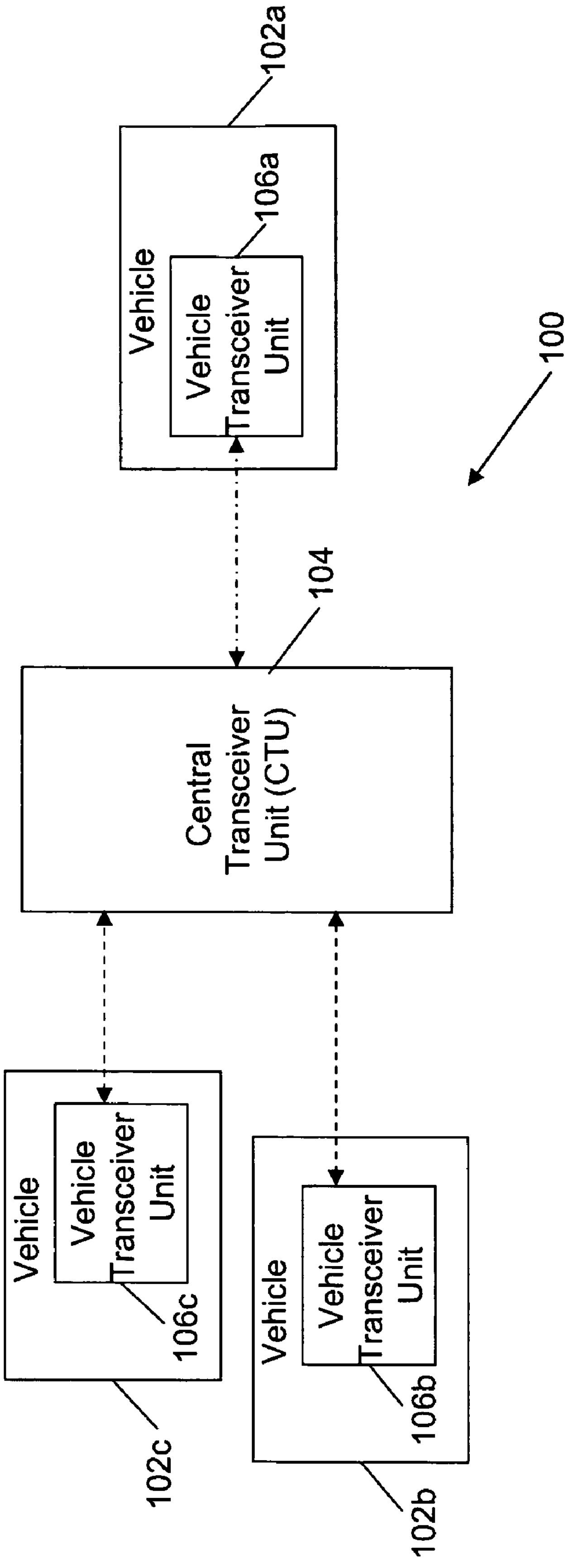
FIG. 1 illustrates an exemplary environment, where the embodiments of the invention can be practiced.

FIG. 1 illustrates an exemplary environment, where the embodiments of the invention can be practiced. Wireless network 100 includes vehicles 102*a*, 102*b* and 102*c* and a central transceiver unit (CTU) 104. Each of the vehicles 102*a*, 102*b* and 102*c* includes a VTU 106*a*, 106*b* and 106*c*, respectively.

Wireless network 100 may be a low-power, low-data-rate wireless ad-hoc network, a Wireless Personal Area Network (WPAN), and so forth. Wireless networking is based on standards specified by the Institution of Electrical and Electronics Engineers (IEEE), such as 802.15 and 802.11. In various embodiments of the invention, wireless network 100 is based on the 802.15.1 or 802.15.4 standards. In an embodiment of the invention, wireless network 100 is based on Zigbee, which is a published set of specifications of high-level communication protocols. The protocols are based on the IEEE 802.15.4, and are designed to use small, low-power devices. In another embodiment of the invention, wireless network 100 is based on Bluetooth technology.

Central transceiver unit (CTU) 104 transmits a message related to the traffic signal. The message is encoded. The message includes data related to the traffic signal. For example, the data may include information on the type of the traffic signal, status of the traffic signal, the positioning of the traffic signal, a stamp from an authorized source, and so forth. In an embodiment of the invention, CTU 104 is a signal-processing unit that is capable of processing, encoding and transmitting data. CTU 104 may be located at or near the traffic signal. Examples of traffic signals include traffic lights, ‘STOP’ signs, speed-limit and yield signs, etc. In various embodiments of the invention, CTU 104 may transmit the message at different transmission rates. For example, a stop sign may transmit a signal at the transmission rate between once a minute and ten times in a minute. In another embodiment of the invention, CTU 104 transmits signals at a higher frequency, based on the type and relevance of the traffic signal. For example, a traffic light may transmit at a higher rate. In various embodiments of the invention, transmission rates are used to differentiate between traffic signals.

The message is received and decoded by VTUs 106*a*, 106*b* and 106*c*. In an embodiment of the invention, VTU 106 is a stationary device or a mobile device placed in a vehicle. The stationary device may be a data and signal-processing unit coupled with display, voice and alarm units. Examples of mobile devices include smart phones, smart cards, Personal Digital Assistants (PDAs), and so forth.

Figure 4:
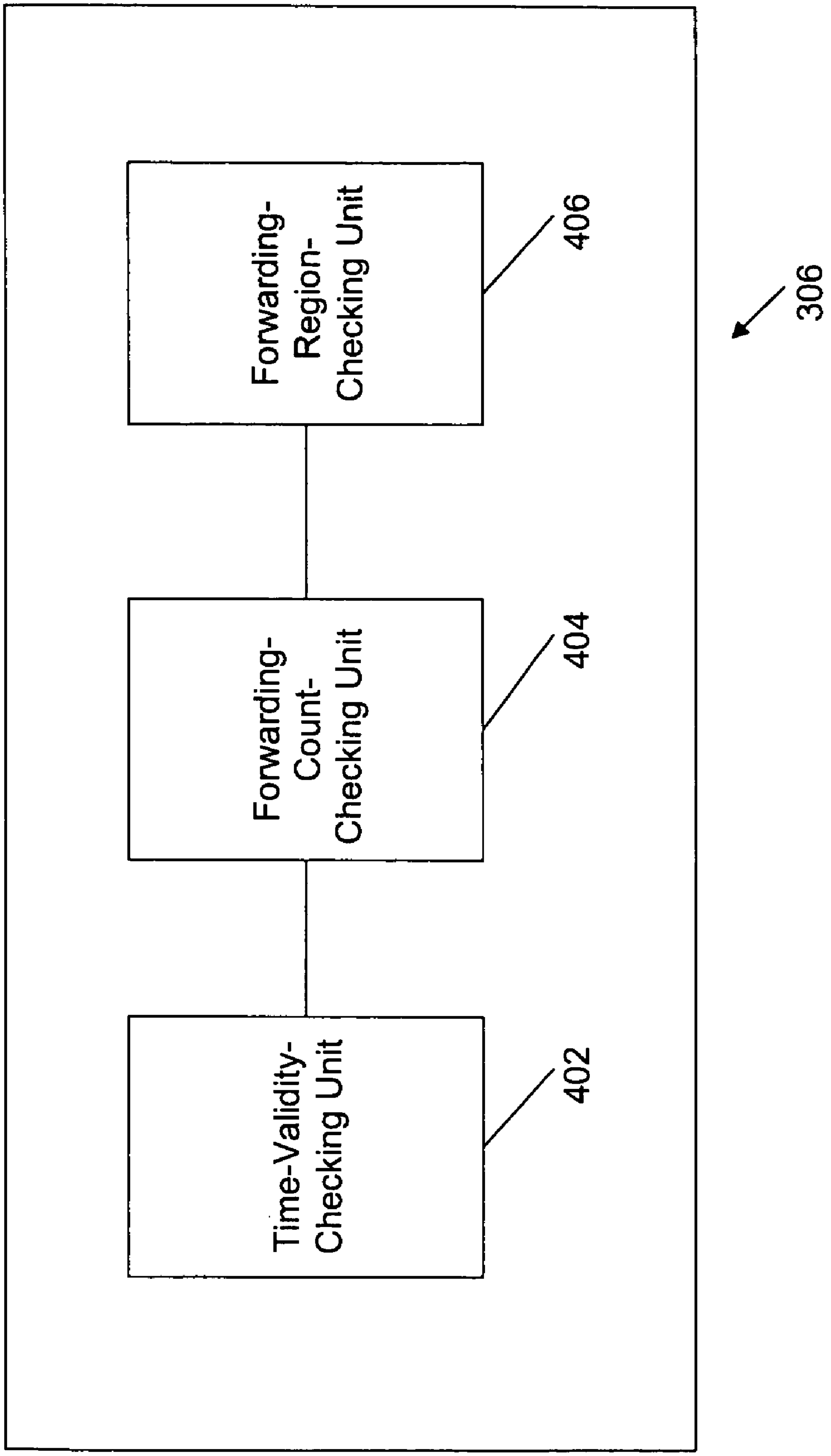
FIG. 4 illustrates a block diagram of a forwarding control unit, in accordance with an exemplary embodiment of the invention.

FIG. 2 illustrates a traffic signal message 200, in accordance with an exemplary embodiment of the invention. Message 200 is transmitted by CTU 104 and received by one or more of VTUs 106*a*, 106*b* or 106*c*. Message 200 includes data related to the traffic signal. As depicted in FIG. 4, the data is divided into different fields, with each field containing a distinct information. Field 202 is a 'Version' of software used in an embodiment of the invention. The software may be used for encoding or formatting message 200. Field 204 is a 'Signal ID' giving information on the identification of the traffic signal. The signal ID 204 may be a unique code or identifier assigned to each traffic signal by an authorized source. For example, signal ID 204 can be represented as an alphanumeric code such as US/MA/02143/98723496. Field 206 is a 'Signal Type' depicting the type of the traffic signal. The traffic signal may be a traffic light, a stop sign and so forth. Field 208 is a 'Location' of the traffic signal, coordinated by a global positioning system (GPS). The value of location 208 may be given in the form of latitudes and longitudes. For example, the value of location 208 may be N 42° 22.298 W 071° 05.890. It may also be given in the form of Universal Transverse Mercator (UTM) coordinates. For example, UTM: 19T E 327245 N 4693171. UTM is a method of defining the position of an element on earth, in the form of a unique zone. Also, an east-west measurement and a north-south measurement are defined to make the position specific inside the zone. Location 208 can be depicted graphically by using a display unit. Field 210 is a 'Directionality', giving the direction in which the traffic signal is located relative to the vehicle. Directionality 210 ensures that the traffic signal is interpreted only when the vehicle is approaching the traffic signal. For example, the directionality may change to 0° when the vehicle has crossed the traffic signal. Field 212 is a 'State' of the traffic signal. For example, state 212 may be 'On' or 'Off.' State 212 may be a green, yellow or red light if signal type 206 is a traffic light. Field 214 is a number of 'Lanes' available while crossing the traffic signal, for example two lanes or four lanes.

Field 216 is a 'Reference Location' of the traffic signal, and field 218 gives 'Forwarding Regions' to define coordinates for position-specific forwarding. In an embodiment of the invention, one or more of VTUs 106*a*, 106*b* or 106*c* may forward message 200 only in an area defined by coordinates given in forwarding Regions 218. Further, the forwarding may be performed inside or outside the area. Field 220 is a 'GPS timestamp' giving the time at which message 200 was transmitted by CTU 104. Field 222 is 'Validity duration', giving the time for which the data in message 200 is valid once it has been transmitted by CTU 104. For example, message 200 may be valid for 0.2 s. Field 224 is a 'CertKeyId', which is a message authentication code or a public key provided by the authorized source. The authorized source may be a traffic authority operating in the area of the traffic signal. Field 226 is a 'Signature' provided by the authorized source to authenticate message 200. CertKeyId 224 is used to verify signature 226. Field 228 is 'Hops-to-live', which is a forwarding count, depicting the number of times message 200 can be forwarded. Hops-to-live 228 is decreased by one, each time message 200 is forwarded. Field 230 is a 'Checksum', which is a code that is formed by using values of all other fields of message 200. When message 200 is received and decoded by one or more of VTUs 106*a*, 106*b* or 106*c*, an arithmetic error detection code may be used to check if contents of message 200 still give the same value of checksum 230. This verifies that values of all other fields in message 200 are valid and unchanged since the time of transmission, and can be communicated to the vehicle controller. In an embodiment of the invention, hops-to-live 228 and checksum 230 are the only fields, which get modified when message 200 is forwarded. In various embodiments of the invention, one or more fields may be dropped or added in message 200.

Figure 3:
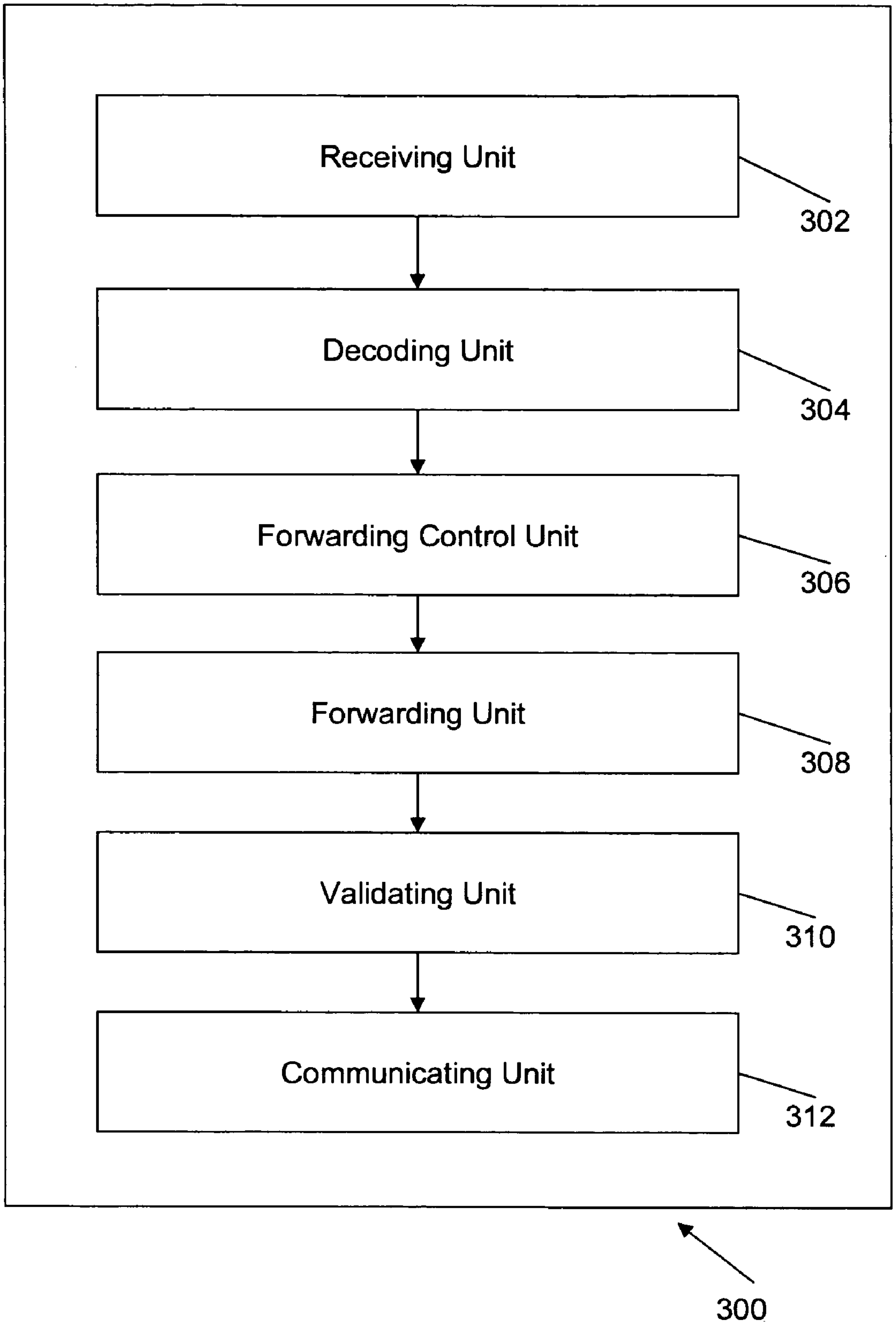
FIG. 3 illustrates a block diagram of a system for wireless communication of a traffic signal, in accordance with an exemplary embodiment of the invention.

FIG. 3 is a block diagram of a system for wireless communication of a traffic signal, in accordance with an exemplary embodiment of the invention. System 300 includes a receiving unit 302, a decoding unit 304, a forwarding control unit 306, a forwarding unit 308, a validating unit 310, and a communicating unit 312. Receiving unit 302 receives message 200 transmitted by CTU 104. Receiving unit 302 includes a signal-processing device that is capable of receiving encoded messages at a tuned frequency. For example, receiving unit 302 may be a tuner, a radio-receiver, a crystal receiver, or other signal-receiving devices. Decoding unit 304 may be a software module, which decodes message 200 and identifies different fields of information contained in it. For example, decoding unit 304 identifies different fields as signal type 206, location 208 and so forth. Decoding unit 304 may be customized according to the number of and the sequence followed in the fields contained in message 200.

Forwarding control unit 306 determines the forwardability of message 200, i.e., whether it is forwardable or not. In an embodiment of the invention, forwarding control unit 306 checks if value of hops-to-live 228 is greater than zero. Forwarding control unit 306 may check if the difference between the time of receiving message 200 and the value of GPS timestamp 220 is less than the value of validity duration 222. Further, forwarding control unit 306 checks if message 200 is received in the area defined by coordinates given in forwarding regions 218. In various embodiments of the invention, the forwardability of message 200 may be based on one or more of the above conditions. Forwarding unit 308 forwards message 200, if it is forwardable. Forwarding unit 308 may be a transmitter device that is capable of transmitting encoded messages received by receiving unit 302. In an embodiment of the invention, forwarding unit 308 is a combination of one or more encoders, amplifiers, synthesizers, antennas, etc. Forwarding unit 308 may forward message 200 to one or more vehicles approaching the traffic signal. In another embodiment of the invention, forwarding unit 308 may forward message 200 to CTU 104. Validating unit 310 checks the validity of message 200. In various embodiments of the invention, the validity is checked based on the values of validity duration 222, signature 226 and checksum 230, by validating unit 310. Validating unit 310 checks if message 200 is received within the time given by validity duration 222 from the time given by GPS timestamp 220. Validating unit 310 also checks if signature 226 is from the authorized source. Further, validating unit 310 may use an arithmetic error detection code to verify validity of message 200, by using checksum 230.

Communicating unit 312 communicates the information on the type, status and positioning of the traffic signal to the vehicle controller. In an embodiment of the invention, signal type 204, location 208 and state 212 is communicated. The vehicle is driven, based on the information communicated to the vehicle controller. GPS guides the communication and forwarding of message 200. In various embodiments of the system, the choice of the communication unit may vary. In an embodiment of the invention, the communicating unit 312 is an alarm unit. In another embodiment of the invention, the communicating unit 312 includes a voice unit and a display unit.

In yet another embodiment of the invention, the communicating unit 312 includes an alarm unit, a display unit and a voice unit. The traffic signal is communicated to a human controller or driver of the vehicle, who takes the desired action. In another embodiment of the invention, an automated vehicle is alerted about the traffic signal by means of an electronic signal, and the vehicle takes the desired action. In yet another embodiment of the invention, if the desired action is not taken, the alarm unit may issue a warning by means of signals such as light and sound signals, etc., to the vehicle controller. In an embodiment of the invention, system 300 uses driver-assisting software to decide whether to display or to communicate electronically to the driver or the automated control about the existence of the traffic signal. System 300 may also use software to decide whether to display graphically the details pertaining to the traffic signal, or to sound a high-priority alert if the vehicle violates the traffic signal.

FIG. 4 illustrates a block diagram of a forwarding control unit 306, in accordance with an exemplary embodiment of the invention. Forwarding control unit 306 includes a time-validity-checking unit 402, a forwarding-count-checking unit 404, and a forwarding-region-checking unit 406. In an embodiment of the invention, time-validity-checking unit 402 may be a software module, which compares the time of receiving message 200 with the time of its validity. Time-validity-checking unit 402 checks if message 200 is received within the time given by validity duration 222 from the time given by GPS timestamp 220. Forwarding-count-checking unit 404 checks the number of times message 200 has already been forwarded. In an embodiment of the invention, forwarding-count-checking unit 404 is a software module that checks the value of hops-to-live 228. If the value of hops-to-live 228 is greater than zero, message 200 is forwardable. Forwarding-region-checking unit 406 checks if message 200 is received within forwarding regions 218. In an embodiment of the invention, forwarding-region-checking unit 406 is a software module that checks if GPS location of the vehicle is within the area defined by the coordinates given in forwarding regions 218. In various embodiments of the invention, the area may lie inside or outside the coordinates of forwarding regions 218. Message 200 is forwardable if the location of one or more of vehicles 102*a*, 102*b* or 102*c* lies within the area. In a preferred embodiment of the invention, forwarding-count-checking unit 404 is always included in forwarding control unit 306. In various embodiments of the invention one or both of time-validity-checking unit 402 and forwarding-region-checking unit 406 may be used in forwarding control unit 306 to determine the forwardability of message 200.

Figure 5:
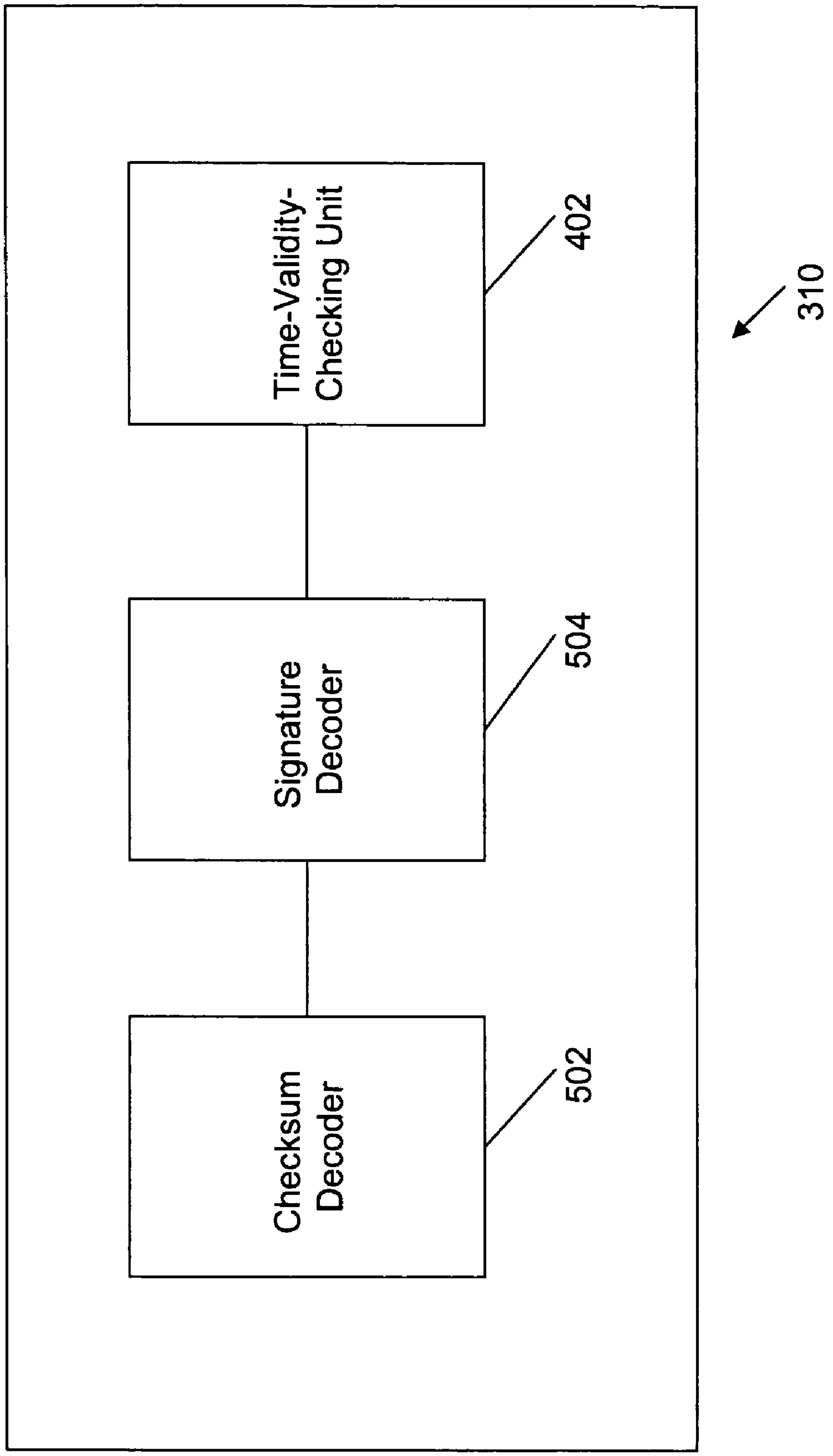
FIG. 5 illustrates a block diagram of a validating unit, in accordance with an exemplary embodiment of the invention.

FIG. 5 illustrates a block diagram of a validating unit 310, in accordance with an exemplary embodiment of the invention. Validating unit 310 includes checksum decoder 502, signature decoder 504 and time-validity-checking unit 506. Checksum decoder 502 checks if values of all the fields of message 200 are correct and unchanged after message 200 was transmitted by CTU 104. In an embodiment of the invention, checksum decoder 502 may be an arithmetic error detection code. It calculates a checksum, using all the fields of message 200 and verifies the validity by comparing the calculated checksum with the value of checksum 230. Signature decoder 504 checks the authenticity of message 200 by checking if it is coming from an authorized source. In an embodiment of the invention, signature 226 contains an encoded signature created using techniques of public key cryptography. The encoded signature needs to be verified to check for authenticity. When a public-key/private-key pair is used for a signature, the authorized source uses the private key to create a signing code, typically by taking some kind of a checksum of message 200 and performing a 'signing' calculation, using the private key. The 'signing' calculation may be equivalent to a 'decode' or 'decrypt' operation on the checksum to produce the signature. To verify the authenticity of the signature, signature decoder 504 uses the public key, which may be certkeyId. 224. The public key verifies that the encoded signature, when 'encoded' or 'encrypted', produces the same checksum. The checksum is calculated independently by signature decoder 504, using all the fields of message 200, except may be, hops-to-live 228 and checksum 230. The fields of message 200 are designated to be protected against tampering/modification. In an embodiment of the invention, time validity checking unit 402 may be a part of validating unit 310 also. In various embodiments of the invention, validating unit 310 may include a combination of one or more of checksum decoder 502, signature decoder 504 and time validity checking unit 506.

In various embodiments of the invention, elements of system 300 such as, receiving unit 202, validating unit 204, communication unit 206, and forwarding unit 208, are implemented in the form of software, hardware, firmware, or their combinations thereof.

Figure 6:
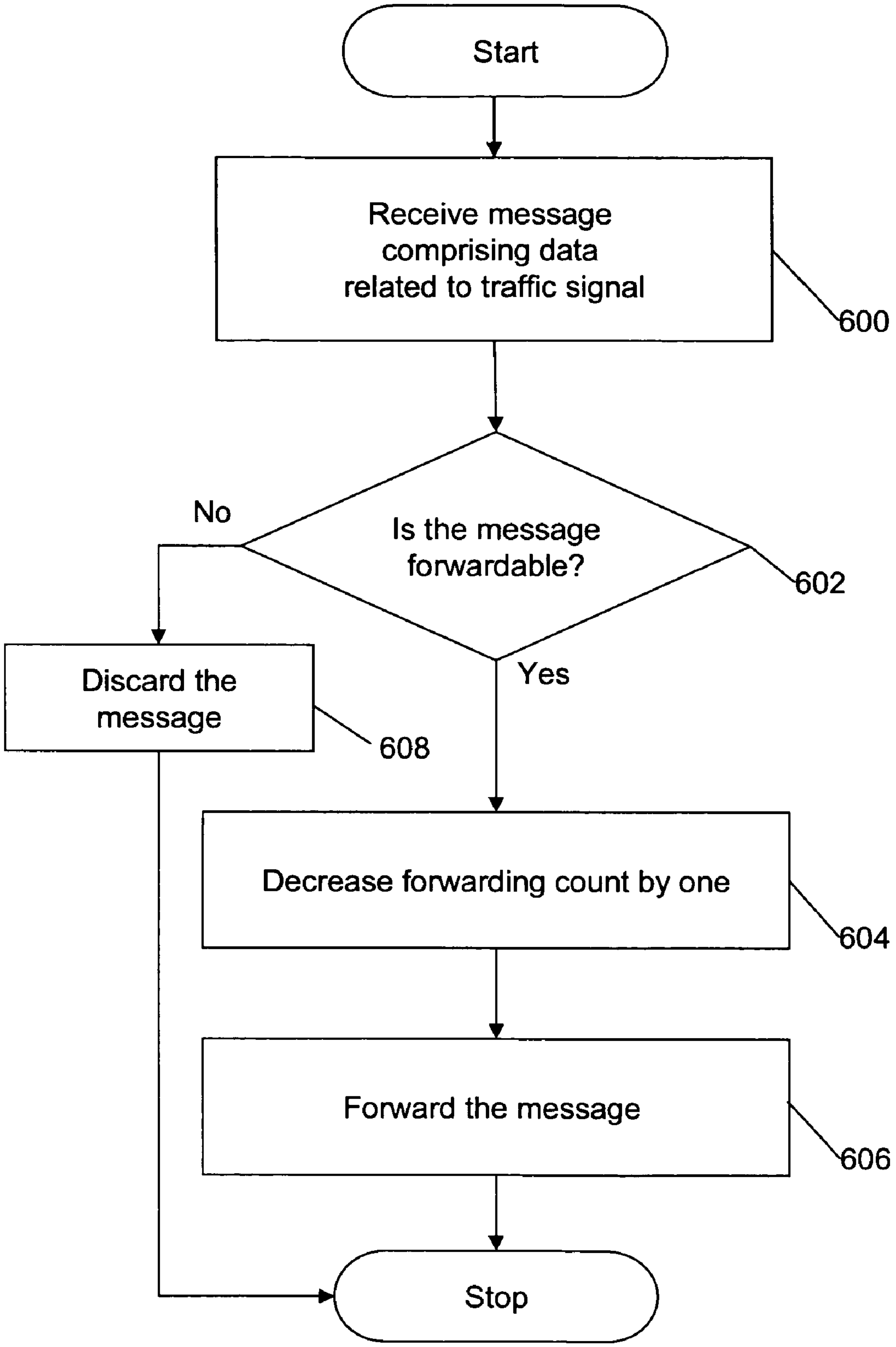
FIG. 6 is a flowchart illustrating a method for wireless communication of a traffic signal, in accordance with an exemplary embodiment of the invention.

FIG. 6 is a flowchart, illustrating a method for wireless communication of a traffic signal, in accordance with an exemplary embodiment of the invention. At step 600, message 200 is received by receiving unit 302. At step 602, the forwardabilty of message 200 is determined by forwarding control unit 306. In an embodiment of the invention, the forwardability of message 200 is determined by using validity duration 222 and GPS timestamp 220, by time validity checking unit 402. The value of validity duration 222 added to GPS time stamp 220 gives the time up to which message 200 is valid. If the time of receiving message 200 is less than the time up to which message 200 is valid, message 200 is forwardable.

In another embodiment of the invention, forwardability of message 200 is determined by using hops-to-live 228, by forwarding count checking unit 404. Hops-to-live 228 is the number of times message 200 can be forwarded. If the value of hops-to-live 228 is greater than zero, message 200 is forwardable. Further, forwardability of message 200 is determined by forwarding-region-checking unit 406 by checking if message 200 is received within forwarding regions 218. In an embodiment of the invention, forwarding region checking unit 406 is a software module that checks and compares the GPS location of the vehicle.

In various embodiments of the invention, forwardability is considered true if one or more of the above conditions are met. If message 200 is found to be forwardable, then at step 604, forwarding count is decreased by one. For example, in an embodiment of the invention, in message 200, hops-to-live 228 is decreased by one. At step 606, message 200 is forwarded by forwarding unit 308. In an embodiment of the invention, message 200 is forwarded to other VTUs 106. In another embodiment of the invention, message 200 may also be forwarded to CTU 104. At step 608, message 200 is discarded, if it is not forwardable.

Figure 7:
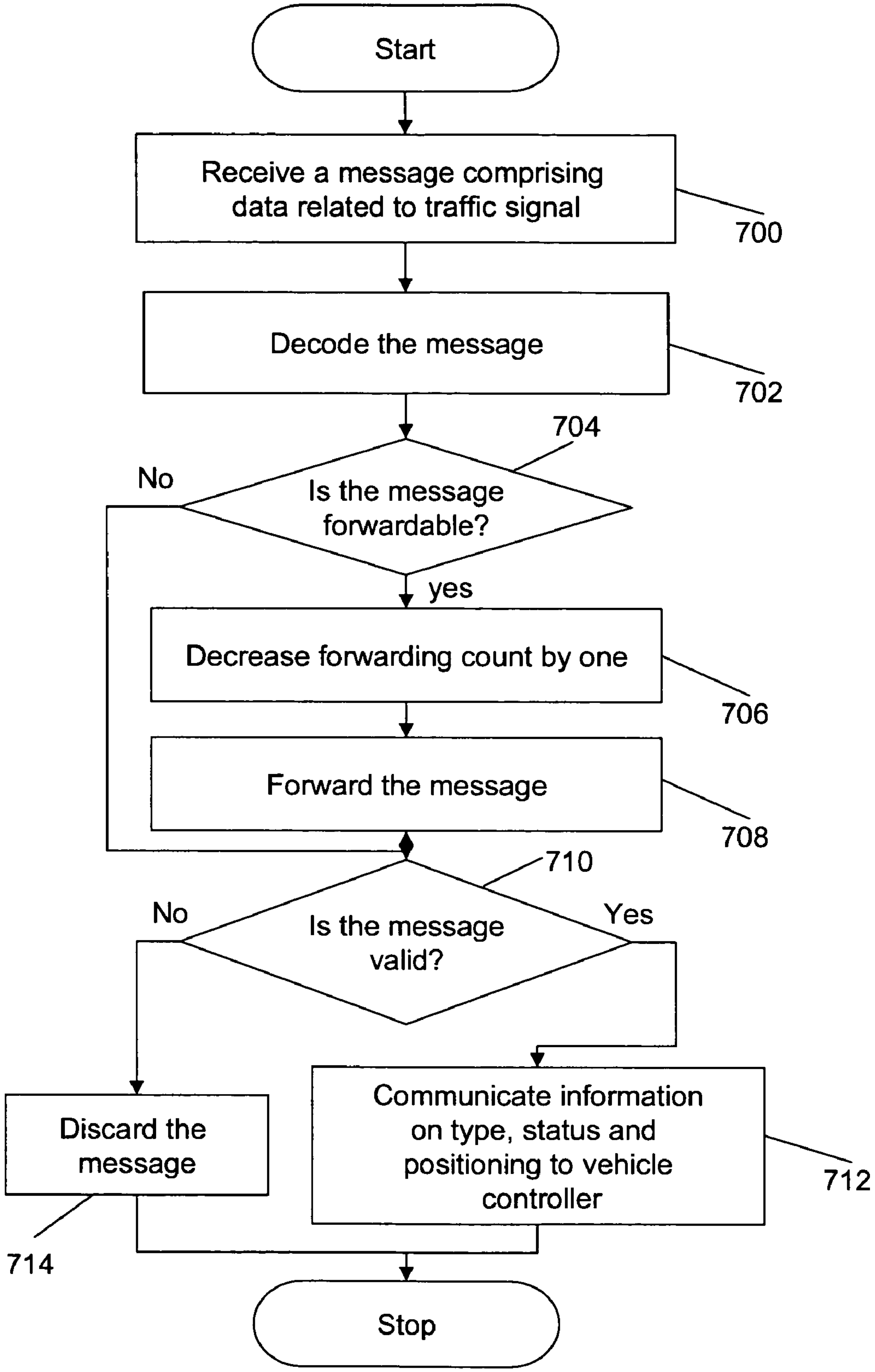
FIG. 7 is a flowchart illustrating a method for wireless communication of a traffic signal, in accordance with another exemplary embodiment of the invention.

FIG. 7 is a flowchart, illustrating a method for wireless communication of a traffic signal, in accordance with another exemplary embodiment of the invention. At step 700, message 200 is received by VTUs 106*a*, 106*b* and 106*c*. In an embodiment of the invention, message 200 is sent by CTU 104. Message 200 is encoded by CTU 104 before it is sent. In an embodiment of the invention, message 200 is encoded to maintain security of data in message 200. To obtain the data related to the traffic signal, at step 702, message 200 is decoded by decoding unit 304. The data includes various fields, with each field containing distinct information. These fields are identified by decoding unit 304. At step 704, forwardability of message 200 is determined by forwarding control unit 306.

In various embodiments of the invention, the forwardability of message 200 is determined using hops-to-live 228 by forwarding-count-checking unit 404. Hops-to-live 228 gives the number of times message 200 can be forwarded. The value of hops-to-live 228 is decreased by one each time message 200 is forwarded. If the value of hops-to-live 228 is greater than zero, message 200 is still forwardable. Further, forwardability of message 200 is determined by forwarding region-checking unit 406 that checks if message 200 is received in the area defined by forwarding regions 218. At step 706, forwarding count is decreased by forwarding unit 308. At step 708, message 200 is forwarded by forwarding unit 308, if message 200 is forwardable. In an embodiment of the invention, message 200 is forwarded to one or more VTUs placed in other vehicles that are approaching the traffic signal. In another embodiment of the invention, message 200 may also be forwarded to CTU 104. In an embodiment of the invention, the forwarded message is a copy of the message received, i.e., message 200, except that hops-to-live 228 is changed. In another embodiment of the invention, a new message including a new signature incorporated by VTU 106, along with the decreased value of hops-to-live 228, is forwarded. This is done by presuming that the VTU units are implemented in secure tamper-proof chips. It is also presumed that the authorized source believes that the VTU units will not be compromised for any fraudulent purposes. This is achieved by decreasing the value of hops to live 228 by one. At step 710, the validity of message 200 is checked by validating unit 310.

In various embodiments of the invention, message 200 is valid if one or more of the above described criteria are satisfied. In one criterion, message 200 is valid if values of all the fields are correct and remain unchanged after they are transmitted by CTU 104. In an embodiment of the invention, this is verified by checksum decoder 502. Checksum decoder 502 may be an arithmetic error-detection code that calculates a checksum, using all the fields of message 200 and verifies the validity by comparing the calculated checksum with the value of checksum 230. According to another criterion, message 200 is valid if it is from an authentic or authorized source. In an embodiment of the invention, this is verified by signature decoder 504, by checking signature 226. This is achieved using techniques of public key cryptography, wherein the authorized source uses a private key to encrypt signature 226. A public key is provided in message 200, which is used to verify signature 226. In an embodiment of the invention, the public key may be certkeyId 224.

According to yet another criterion, if validity duration 222 holds at the time of receiving, message 200 is valid. Contents of message 200 are valid up to a time given by validity duration 222, from the time given by GPS timestamp 220. At step 712, information on type, status and positioning of the traffic signal is communicated to the vehicle controller, by communicating unit 312. For example, in an embodiment of the invention, signal type 204, location 208, and state 212 are communicated. The controller operates the vehicle, based on the information received from communicating unit 312. In an embodiment of the invention, communication may be done by the display unit, graphically, or otherwise. The traffic signals may be displayed on electronic maps such as the diagrams of upcoming road intersections that are often displayed by on-board car navigation systems. In another embodiment of the invention, in case there is a human controller or driver, communication may be carried out using the voice unit. In case of issuing an alarm, audio-visual means may be used. In yet another embodiment of the invention, for automatically-driven vehicles, some signals may be communicated to vehicle controls, such as anti-lock braking systems and cruise (speed) control. At step 714, message 200 is discarded, if it has been found invalid by validating unit 310.

In an embodiment of the invention, message 200 is forwarded only within a forwarding region, which includes a space or zone surrounding the traffic signal. For example, message 200 is forwarded, based on the coordinates given by forwarding regions 218. The coordinates are vertices of virtual bounding polygons. These bounding polygons define the forwarding region. The vertices are specified by the GPS. The space surrounding the traffic signal is divided into an active zone and a warning zone. The active and warning zones comprise a fixed number of bounding polygons. In an embodiment of the invention, for a stop sign, the information on positioning comprises a description of a rectangle that covers that portion of the road where a vehicle would typically be expected to halt. The rectangle is labeled as the active zone. For example, the active zone may be a 10×20 feet area. A larger area, extending back along the road, is labeled as the warning zone. For example, the warning zone may be extended 50 feet back from the active zone along the road. In message 200, forwarding regions 218 define the vertices of a rectangle. In an embodiment of the invention, forwarding is enabled within the rectangle. In another embodiment of the invention, forwarding is enabled before the vehicle enters the rectangle. In an embodiment of the invention, communicating unit 312 is guided by positioning information. For example, the display or voice unit informs the driver of the vehicle in the warning zone that there is a traffic signal ahead. The alarm unit starts functioning if the driver violates the signal and reaches the active zone.

Embodiments of the invention present many advantages over the conventional traffic control systems, which can be improved by a reliable automated system. Traffic signals reach directly into the cockpits of vehicles without relying on static or central maps of the traffic signals thereby, decreasing errors in observing or interpreting the traffic signal. Moreover, the method ensures the communication of secure self-describing messages among the participating nodes in a wireless network communications system, where the forwarding rules depend on position, time, and other message attributes. Embodiments of the invention provide another advantage of using low power ad-hoc communications protocol where a traffic signal and its surrounding traffic participate in a small network independent of any other operating network. Embodiments of the invention provide yet another advantage of transmitting signal information at a very low data rate, thereby avoiding crowding of signals in the network. Further, the power level of the transmitted signal is such that the lifetime of the batteries or cells ranges to months.

Although the invention has been discussed with respect to specific embodiments thereof, these embodiments are merely illustrative, and not restrictive, of the invention. For example, a 'method for wireless communication of a traffic signal' can include any type of analysis, manual or automatic, to anticipate the needs of the method.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed.

The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Reference throughout this specification to "an embodiment", "an embodiment", or "a specific embodiment" means that a particular feature, structure, or characteristic described in connection with the embodiment is included in at least an embodiment of the present invention and not necessarily in all embodiments. Thus, respective appearances of the phrases "in an embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for wireless communication of a traffic signal over a network, the method comprising:

receiving an encoded message in a vehicle transceiver unit (VTU) of a first of a plurality of vehicles on the network, wherein the encoded message includes data related to the traffic signal;

decoding the encoded message in the VTU of the first vehicle to form a message having a plurality of fields of the data related to the traffic signal;

determining if the message is forwardable from the first vehicle to another one or more vehicles on the network, the forwardable determination being made by using at least one of the plurality of fields;

when the message is determined to be forwardable:

modifying at least one of the plurality of fields to form a modified message;

encoding the modified message to form a modified encoded message; and forwarding the modified encoded message to a second of the plurality of vehicles, the second vehicle approaching the traffic signal; and discarding the message when the message is determined to be non-forwardable.

2. The method of claim 1, wherein the modifying the at least one of the plurality of fields when the message is forwardable comprises reducing a forwarding count.

3. The method of claim 1, further comprising discarding the message when the message is determined to be non-forwardable.

4. The method of claim 1, wherein the data comprises information on a type of the traffic signal, a status of the traffic signal, a positioning of the traffic signal, and a validity of the message.

5. The method of claim 4, further comprising communicating the information on the type, the status, and the positioning of the traffic signal to a vehicle operator, when the message is valid.

6. The method of claim 4, wherein the information on the positioning of the traffic signal comprises information on a geographical area, the geographical area including bounding polygons of predefined vertices specified by a Global Positioning System (GPS).

7. The method of claim 6, wherein the geographical area is divided into an active zone and a warning zone.

8. The method of claim 6, wherein the message is determined to be forwardable when the message is received within the bounding polygons.

9. The method of claim 7, wherein the message is determined to be forwardable when the message is received in the warning zone.

10. The method of claim 4, wherein the information on the validity of the message comprises a signature of an authorized source, a timestamp, a message validity time, a forwarding count, and a checksum.

11. The method of claim 10, wherein the message is determined to be forwardable when a difference between a time of receiving the message and the timestamp is less than the message validity time.

12. The method of claim 10, wherein the message is determined to be forwardable when the forwarding count is more than zero.

13. The method of claim 10, further comprising encoding the signature of the authorized source.

14. The method of claim 10, wherein the message is valid when the signature contained in the information on the validity of the message is from the authorized source.

15. The method of claim 10, wherein the message is valid when a difference between the time of receiving the message and the timestamp is less than the message validity time.

16. The method of claim 10, wherein the message is valid when a checksum calculated for the data matches the checksum contained in the information on the validity of the message.

17. A method for wireless communication of a traffic signal over a network, the method comprising:

receiving an encoded message in a vehicle transceiver unit (VTU) of a first of a plurality of vehicles on the network, wherein the encoded message includes data related to the traffic signal;

decoding the encoded message in the VTU of the first vehicle to form a message having a plurality of fields of the data related to the traffic signal;

determining a forwardability of the message from the first vehicle to another one or more vehicles on the network, the forwardability determination being made by using at least one of the plurality of fields;

encoding and forwarding the message to a second of the plurality of vehicles when the message is determined to be forwardable, the second vehicle approaching the traffic signal;

discarding the message when the message is determined to be non-forwardable;

when the message is determined to be valid, communicating information on a type, a status, and a positioning of the traffic signal to a vehicle controller; and discarding the message when the message is determined to be invalid.

18. A system for wireless communication of a traffic signal over a network, the system comprising:

a vehicle transceiver unit (VTU), the VTU receiving an encoded message in a first of a plurality of vehicles on the network, wherein the encoded message includes data related to the traffic signal;

a forwarding-control unit for determining when the message is forwardable from the first vehicle to another one or more vehicles on the network, the forwardable determination being made by using at least one of a plurality of fields derived from the encoded message; and a forwarding unit, wherein the forwarding unit forwards the message to a second of the plurality of vehicles when the message is determined to be forwardable, the second vehicle approaching the traffic signal, and wherein the message is discarded when the message is determined to be non-forwardable.

19. The system of claim 18, further comprising:

a decoding unit, wherein the decoding unit decodes the encoded message to form a message having the plurality of fields of the data related to the traffic signal;

a validating unit, wherein the validating unit determines a validity of the message, a communicating unit, wherein the communicating unit communicates information on a type, a status, and a positioning of the traffic signal, to a vehicle controller.

20. The system of claim 18, wherein the forwarding-control unit comprises:

a forwarding-count-checking unit, wherein the forwarding-count-checking unit determines when a forwarding count is greater than zero; and a time-validity-checking unit, wherein the time-validity-checking unit determines when the message is valid at a time of the receiving.

21. The system of claim 18, wherein the forwarding-control unit comprises:

a forwarding-region-checking unit, wherein the forwarding-region-checking-unit determines when the message is received within a predefined geographical region.

22. The system of claim 19, wherein the validating unit comprises:

a checksum decoder, wherein the checksum decoder compares a given checksum and a calculated checksum;

a signature decoder, wherein the signature decoder decodes a signature contained in the information that is related to the validity of the message; and a time-validity-checking unit, wherein the time-validity-checking unit checks a time validity of the message.

23. A system for wireless communication of a traffic signal over a network, the system comprising:

means for receiving an encoded message in a vehicle transceiver unit (VTU) of a first of a plurality of vehicles on the network, wherein the encoded message includes data related to the traffic signal;

means for decoding the encoded message in the VTU of the first vehicle to form a message having a plurality of fields of the data related to the traffic signal;

means for determining the forwardability of the message from the first vehicle to another one or more vehicles on the network, the forwardability determination being made by using at least one of the plurality of fields;

means for forwarding the message to a second of the plurality of vehicles when the message is determined to be forwardable, the second vehicle approaching the traffic signal; and means for discarding the message when the message is determined to be non-forwardable.

24. An apparatus for wireless communication of a traffic signal over a network, the apparatus comprising:

a processor for executing instructions, the processor coupled to a voice/display unit; and a computer-readable storage medium including instructions encoded therein, the instructions being executable by the processor, the instructions comprising:

one or more instructions for receiving an encoded message in a vehicle transceiver unit (VTU) of a first of a plurality of vehicles on the network, wherein the encoded message includes data related to the traffic signal;

one or more instructions for decoding the encoded message in the VTU of the first vehicle to form a message having a plurality of fields of the data related to the traffic signal;

one or more instructions for determining the forwardability of the message from the first vehicle to another one or more vehicles on the network, the forwardability determination being made by using at least one of the plurality of fields;

one or more instructions for modifying at least one of the plurality of fields when the message is determined to be forwardable;

one or more instructions for encoding the modified message when the message is determined to be forwardable;

one or more instructions for forwarding the modified encoded message to a second of the plurality of vehicles when the message is determined to be forwardable, the second vehicle approaching the traffic signal; and one or more instructions for discarding the message when the message is determined to be non-forwardable.

25. A computer-readable storage medium including instructions encoded therein for wireless communication of a traffic signal over a network, the instructions being executable by a computer processor, the computer-readable storage medium comprising:

one or more instructions for receiving an encoded message in a vehicle transceiver unit (VTU) of a first of a plurality of vehicles on the network, wherein the encoded message includes data related to the traffic signal;

one or more instructions for decoding the encoded message in the VTU of the first vehicle to form a message having a plurality of fields of the data related to the traffic signal;

one or more instructions for determining the forwardability of the message from the first vehicle to another one or more vehicles on the network, the forwardability determination being made by using at least one of the plurality of fields;

one or more instructions for modifying at least one of the plurality of fields when the message is determined to be forwardable;

one or more instructions for encoding the modified message when the message is determined to be forwardable;

one or more instructions for forwarding the modified encoded message to a second of the plurality of vehicles when the message is determined to be forwardable, the second vehicle approaching the traffic signal; and one or more instructions for discarding the message when the message is determined to be non-forwardable.

* * * * *